No. 827,832. PATENTED AUG. 7, 1906.
J. VEIT.
BLOTTING PAD.
APPLICATION FILED JAN. 8, 1906.

Witnesses:

Inventor:
Josef Veit

THE NORRIS PETERS CO., WASHINGTON, D. C.

UNITED STATES PATENT OFFICE.

JOSEF VEIT, OF NEW YORK, N. Y.

BLOTTING-PAD.

No. 827,832.

Specification of Letters Patent.

Patented Aug. 7, 1906.

Application filed January 8, 1906. Serial No. 295,195.

*To all whom it may concern:*

Be it known that I, JOSEF VEIT, a citizen of the United States, residing at New York, in the county of New York and State of New York, have invented certain new and useful Improvements in Blotting-Pads, of which the following is a specification.

This invention relates to the manufacture of an absorbent material; and it has particular reference to the production of a blotting-pad for desk use.

The object is to construct an article which will act as an absorbent of ink and which can also be used as a paper-weight, all of which will now be set forth in detail.

Figure 1:
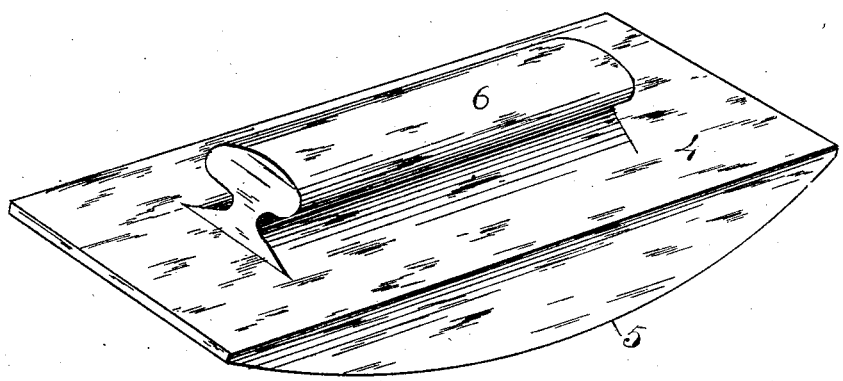
Figure 2:
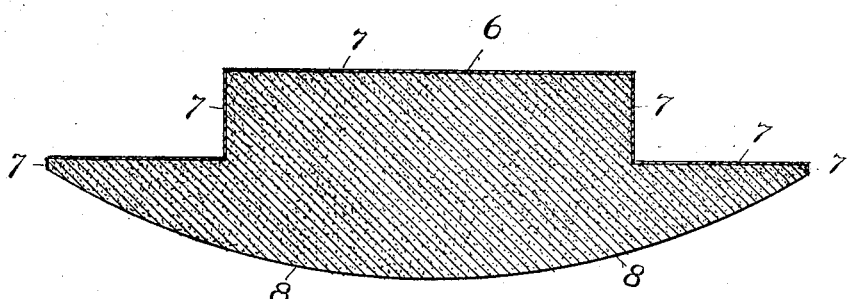
Figure 3:
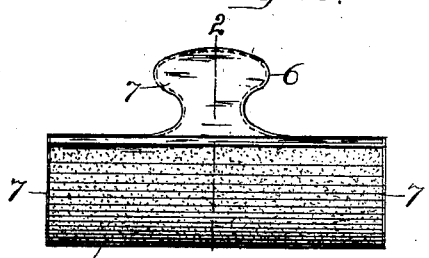

In the drawings, Figure 1 is a perspective view of my improved absorbent pad. Fig. 2 is a vertical longitudinal section on line 2 of Fig. 3, and Fig. 3 is an end view of the pad.

I prefer to construct the pad of china-clay, alumina, and silica, water being added to the mass and the whole reduced to a paste. I then mold the same into the proper shape, preferably in a rectangular form, as shown at 4, with its lower surface 5 curved from end to end and having on its upper surface a handle 6. The form thus produced is baked a suitable period, after which it is dipped for the purpose of providing a glazed surface 7, and then baked, as is usual with products of this class.

I am aware it is not new to make a pad of this character of clay or like material and then coat the same with paint, varnish, lacquer, or other similar material. Hence I lay no claim to such an article, but confine my product to an article of this kind which is provided with a coating that is baked on in the kiln. Such a coating is infinitely superior to a product where the covering is made of the paint variety and is practically indestructible, since the coating thus formed serves to preserve the body of the pad from injury, whereas a paint or lacquer has no such value in products of this kind.

When the cake is removed from the glazing-oven, the glazed surface on the under portion of same is removed in any suitable manner, thus exposing an unglazed clay surface, as at 8, which then serves admirably for absorbing all superfluous ink from newly-written manuscript, and, unlike blotting-paper, will require no renewal. The under or contact surface may be freshened and undue accumulations of ink removed therefrom by rubbing same at infrequent intervals on sandpaper.

What I claim as new is—

As a new article of manufacture, a blotting-pad of clay, or other suitable material, capable of being baked, having its lower surface curved and unglazed, and all its other surfaces covered by a baked glaze.

In testimony whereof I affix my signature in presence of two witnesses.

JOSEF VEIT.

Witnesses:
WM. H. EASTER,
J. S. ZERBY.